United States Patent
Ach

(10) Patent No.: US 7,607,204 B2
(45) Date of Patent: Oct. 27, 2009

(54) BELT END CONNECTION FOR FASTENING THE END OF A SUPPORTING BELT IN AN ELEVATOR SYSTEM AND METHOD FOR FASTENING THE END OF A SUPPORTING BELT IN AN ELEVATOR SYSTEM

(75) Inventor: Ernst Ach, Ebikon (CH)

(73) Assignee: Inventio AG, Hergiswil NW (CH)

( * ) Notice: Subject to any disclaimer, the term of this patent is extended or adjusted under 35 U.S.C. 154(b) by 82 days.

(21) Appl. No.: 11/662,672

(22) PCT Filed: Sep. 7, 2005

(86) PCT No.: PCT/CH2005/000532

§ 371 (c)(1),
(2), (4) Date: Oct. 15, 2007

(87) PCT Pub. No.: WO2006/029544

PCT Pub. Date: Mar. 23, 2006

(65) Prior Publication Data

US 2008/0282512 A1    Nov. 20, 2008

(30) Foreign Application Priority Data

Sep. 13, 2004    (EP) ................... 04021671

(51) Int. Cl.
*B66B 7/08*    (2006.01)
*F16G 11/04*    (2006.01)
(52) U.S. Cl. .................... 24/136 R; 187/411
(58) Field of Classification Search ............. None
See application file for complete search history.

(56) References Cited

U.S. PATENT DOCUMENTS

| | | | | | |
|---|---|---|---|---|---|
| 134,052 | A | * | 12/1872 | Gurley | 24/25 |
| 2,085,333 | A | * | 6/1937 | Reynolds | 403/211 |
| 2,629,155 | A | * | 2/1953 | Jobby | 24/136 R |
| 6,128,809 | A | * | 10/2000 | Khokhar | 24/168 |
| 6,256,841 | B1 | * | 7/2001 | Ericson et al. | 24/136 R |
| 6,345,419 | B1 | * | 2/2002 | Traktovenko | 24/136 R |
| 6,353,979 | B1 | * | 3/2002 | Traktovenko | 24/136 R |
| 6,357,085 | B2 | * | 3/2002 | Ericson et al. | 24/136 R |
| 6,484,368 | B1 | * | 11/2002 | Rivera et al. | 24/115 R |
| 6,513,204 | B2 | * | 2/2003 | Rivera et al. | 24/136 R |
| 6,854,164 | B2 | * | 2/2005 | Bass et al. | 24/136 R |
| 6,994,487 | B2 | * | 2/2006 | Traktovenko et al. | 403/314 |
| 7,469,774 | B2 | * | 12/2008 | Ach | 187/411 |
| 2002/0042973 | A1 | | 4/2002 | Rivera et al. | |
| 2002/0154944 | A1 | * | 10/2002 | Traktovenko et al. | 403/347 |
| 2003/0041419 | A1 | * | 3/2003 | Perez et al. | 24/136 R |
| 2004/0143940 | A1 | * | 7/2004 | Bass et al. | 24/136 R |

FOREIGN PATENT DOCUMENTS

EP    1252086 A    10/2002

* cited by examiner

*Primary Examiner*—Jack W. Lavinder
(74) *Attorney, Agent, or Firm*—Fraser Clemens Martin & Miller LLC; William J. Clemens

(57) ABSTRACT

A belt end connection and method for fastening a belt end in an elevator installation includes a housing having a wedge pocket for holding the support belt end and a wedge. At least one wedge pocket surface facing the wedge is provided with a roughness that is different from a roughness of another surface of the wedge pocket. Advantageously, a wedge pocket adhesion surface lying closer to a loose run of the support belt is provided with a roughness greater than the roughness of the another surface, or a wedge pocket slide surface lying closer to a supporting run of the support belt is provided with a roughness less than the roughness of the another surface.

12 Claims, 4 Drawing Sheets

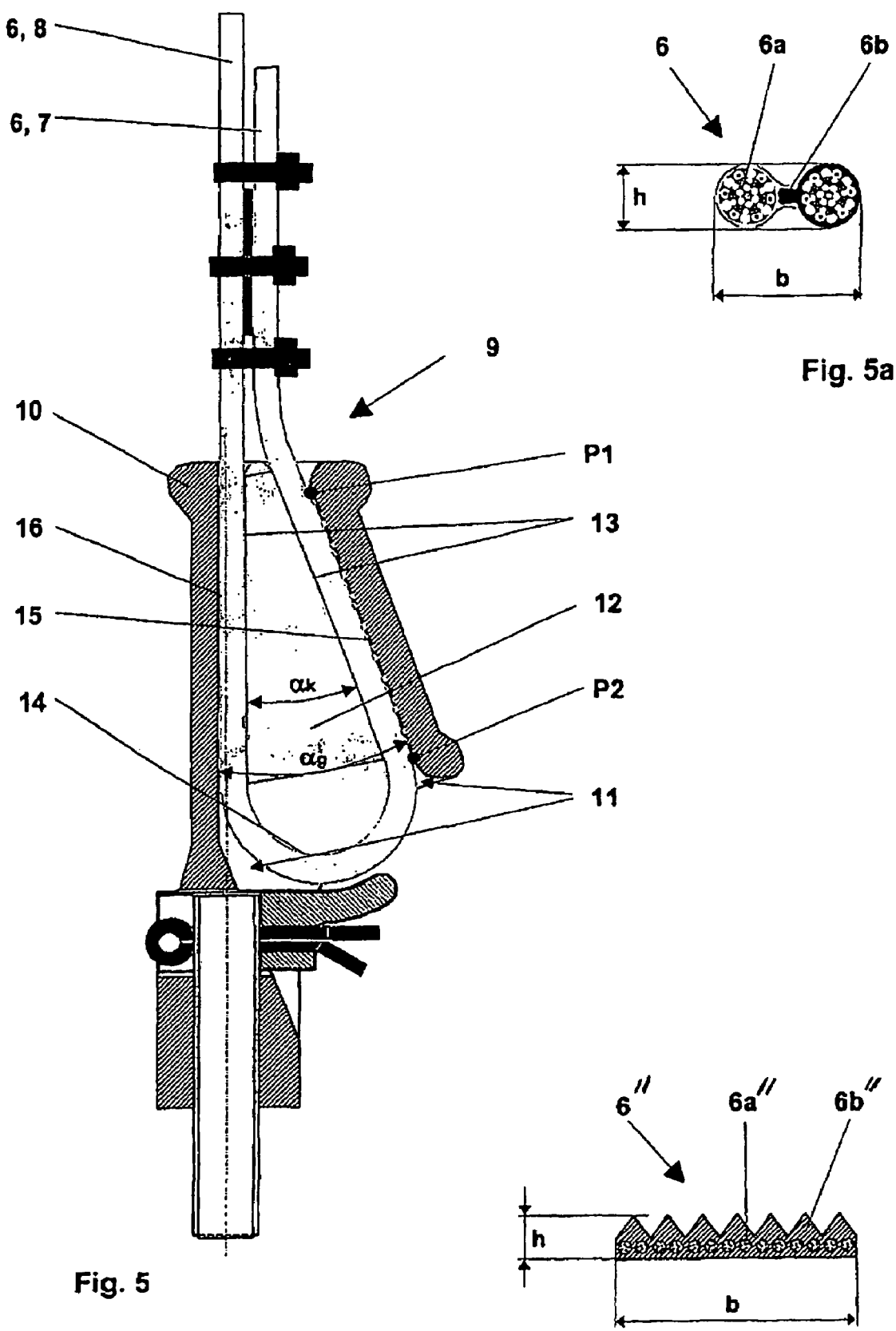

BELT END CONNECTION FOR FASTENING THE END OF A SUPPORTING BELT IN AN ELEVATOR SYSTEM AND METHOD FOR FASTENING THE END OF A SUPPORTING BELT IN AN ELEVATOR SYSTEM

FIELD OF THE INVENTION

This invention relates to a belt end connection for fastening an end of a support belt in an elevator installation and a method for fastening an end of a support belt in an elevator installation.

BACKGROUND OF THE INVENTION

An elevator installation usually consists of a car and a counterweight, which are moved in opposite sense in an elevator shaft. The car and the counterweight are connected together and supported by means of a support belt.

One end of the support belt is in that case fastened by a belt end connection to the car or the counterweight, respectively, or in the elevator shaft. The location of the fastening is directed towards the form of construction of the elevator installation. The belt end connection accordingly has to transmit the force, which acts in the support belt, to the car or the counterweight, respectively, or to the elevator shaft. It has to be designed in such a way that it can securely transmit a required supporting force of the support belt. If the elevator installation also has to withstand a fire situation in the building, the belt end connection also has to endure increased temperatures.

In known constructions the support belt is fixed in a wedge pocket by means of a wedge. A first wedge pocket surface of the wedge pocket is in this connection constructed in correspondence with a direction of tension of the support belt. This first wedge pocket surface is arranged in the take-off direction of the support belt. A second wedge pocket surface of the wedge pocket is formed to be displaced relative to the first wedge pocket surface in correspondence with a wedge angle of the wedge. The support belt is now arranged between wedge pocket surfaces and wedge and it draws the wedge into the wedge pocket by virtue of the friction conditions, whereby the support belt is fixed. Obviously the supporting run of the support belt thus slides, whilst the support force is built up, along the first wedge pocket surface, whereagainst the loose run of the support belt experiences only a slight stretching movement in its position relative to the second wedge pocket surface. In the following the first wedge pocket surface is termed wedge pocket slide surface and the second wedge pocket surface is termed wedge pocket adhesion surface.

A belt end connection of that kind is known from European patent EP 1252086, in which the wedge pocket is constructed in such a manner that the wedge is strongly pressed in a region, whereby the pressing on the support belt takes place non-uniformly, ideally increasing in upward direction on the wedge pocket slide surface with respect to the side remote from the entry point of the support belt. A disadvantage of this construction is that the support belt is subjected in the regions of increased pressing to a very strong punctiform loading, which can have a disadvantageous effect on the service life of the support belt.

SUMMARY OF THE INVENTION

Objects of the present invention are correspondingly to provide a belt end connection which:

does not have strong punctiform loadings,
securely transmits the permissible support force of the support belt,
in the case of need also withstands increased ambient temperatures and
is assembly-friendly and favorable in costs.

The present invention relates to a belt end connection for fastening a belt end in an elevator installation and to a method for fastening a support belt in an elevator installation.

The elevator installation consists of a car and a counterweight, which are moved in opposite sense in an elevator shaft. The car and the counterweight are connected together and supported by means of a support belt. One end of the support belt is fastened by a belt end connection to the car or the counterweight, respectively, or in the elevator shaft. The location of the fastening is oriented towards the kind of construction of the elevator installation. The support belt is held in the belt end connection by means of a wedge which fixes the support belt in a wedge pocket. The part of the belt end connection containing the wedge pocket is formed by a wedge housing. The support belt has a loose run at its unloaded end. This loose run runs on the wedge pocket adhesion surface inclined relative to the vertical direction and is there pressed by the wedge, by means of its wedge clamping surface, onto the wedge pocket adhesion surface. The support belt is now guided around a wedge curve and runs between an opposite wedge clamping surface and the wedge pocket slide surface, which is oriented substantially vertically or in the direction of tension of the support belt, to the supporting run of the support belt. The tension force of the support belt is thus applied by the pressing along the wedge pocket surfaces and the looping around of the wedge. The tolerable tension force of the support belt is in that case decisively influenced by the surface property of the contacting surfaces. One possibility of describing this surface property is the roughness of the surface. The roughness is in that case a measure for the deviation in shape of an effective surface from a geometrically ideal surface shape as outlined in DIN4762. A large roughness value in that case signifies a rough surface, whereby also the coefficient of friction is increased, and a small roughness value signifies a smooth surface, which usually corresponds with a low coefficient of friction. Use is made of, inter alia, an arithmetic mean roughness value "Ra" for indication of the roughness. The roughness can be determined by measuring, but on many occasions determination of the roughness is undertaken on the basis of reference samples.

According to the present invention at least one surface, which faces the wedge, of the wedge pocket is provided with a roughness which is different by comparison with the remaining surface of the wedge pocket or of the wedge housing.

The advantage of this invention is to be seen in that the friction force able to be transmitted from the wedge housing to the support belt is increased and that the loading of the support belt is reduced. Thus, an economic belt end connection can be provided.

In a particularly advantageous embodiment a wedge pocket adhesion surface lying closer to a loose run of the support belt is provided with a roughness increased by comparison with the remaining surface of the wedge pocket or a wedge pocket slide surface lying closer to a supporting run of the support belt is provided with a roughness reduced by comparison with the remaining surface of the wedge pocket. This is particularly advantageous, since in the case of loading of the support belt the pressing force, which arises through drawing in of the wedge, of the wedge on the wedge pocket increases especially the possible supporting force in the support belt on the side of the wedge pocket adhesion surface, since this surface has an increased roughness, whereby the maximum possible support belt force is increased as a consequence of the deflection around the wedge without the pressing of the support belt then being too high. The force is in that case continuously increased, since the force increase is built up on the side of the loose run. As a result, a high punctiform pressing or jump in load is not produced and a high supporting force can be transmitted. Moreover, the wedge pocket surface on which the support belt slides during the loading process is realized with a lesser roughness, which counteracts damage of the support belt, since the surface thereof is not damaged. An economic belt end connection with high load-bearing load can be provided by means of this invention.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 5 shows a detail sectional view of the belt end fastening of FIGS. 3 and 4;

FIG. 5a is a schematic cross-sectional illustration of the support belt consisting of an encased double cable;

FIG. 5b is a schematic cross-sectional illustration of an alternate support belt consisting of several encased cable strands;

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
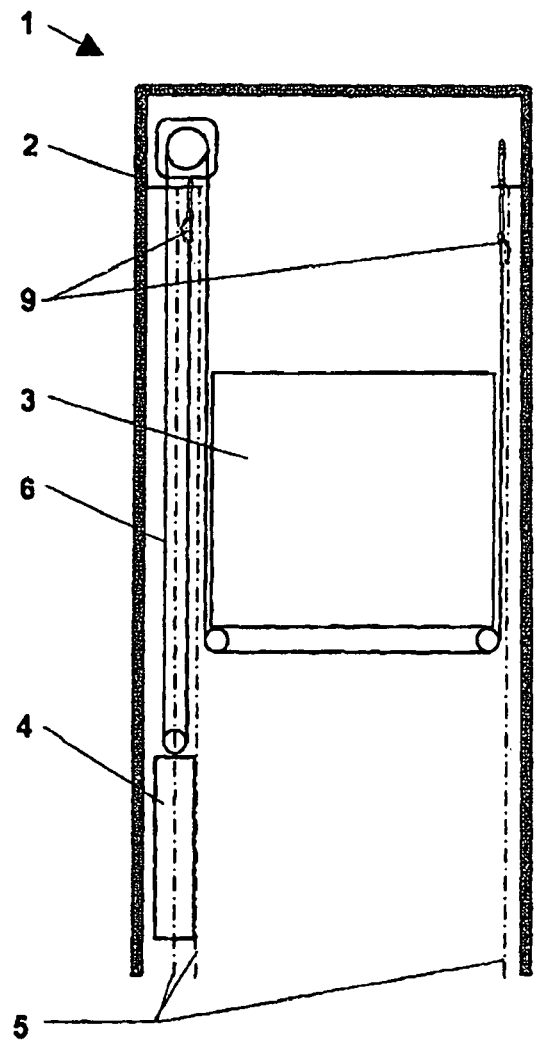
FIG. 1 is a schematic elevation view of an elevator installation, which has underslinging, with a belt end fastening fastened in the elevator shaft.
Figure 2:
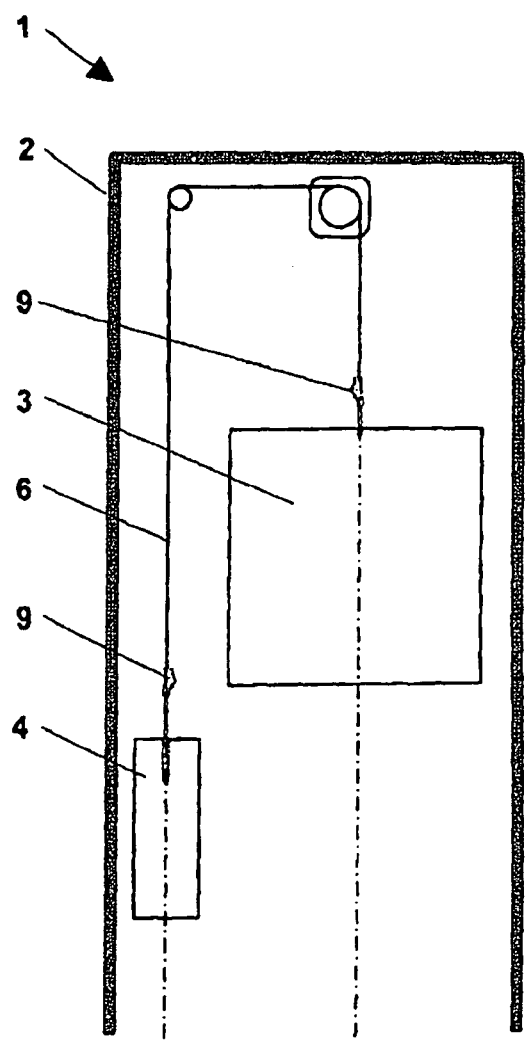
FIG. 2 is a view similar to FIG. 1 of an elevator installation, which is directly suspended, with a belt end fastening fastened to a car or a counterweight.

The elevator installation 1 consists, as illustrated in FIGS. 1 and 2, of a car 3 and a counterweight 4, which are moved in opposite sense in an elevator shaft 2. The car 3 and the counterweight 4 are connected together and supported by means of a support belt 6. One end of the support belt 6 is fastened by a belt end connection 9 to the car 3 or the counterweight 4, according to FIG. 2, or in the elevator shaft 2, according to FIG. 1. The location of the fastening is oriented towards the mode of construction of the elevator installation 1.

Figure 3:
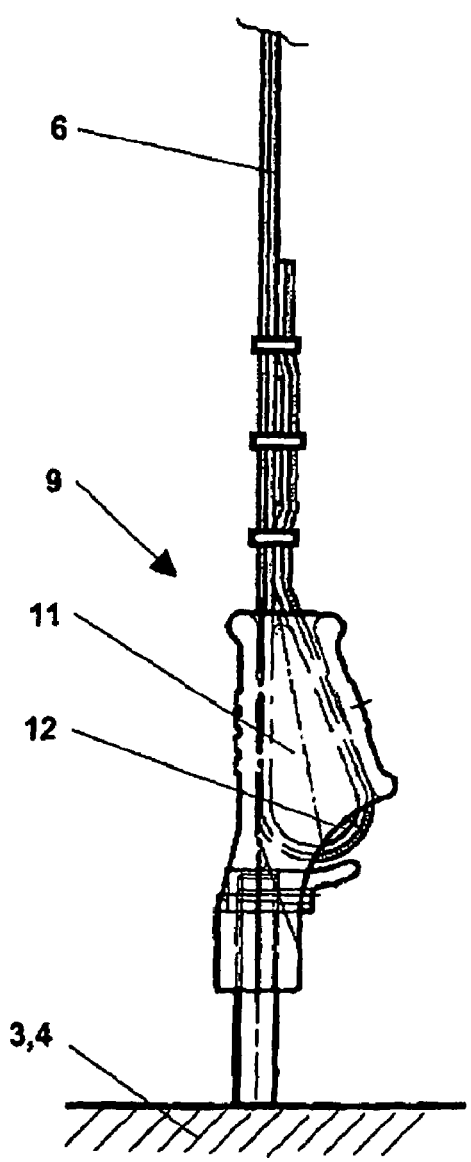
FIG. 3 shows a belt fastening according to the present invention, fastened to a car or a counterweight, with an upwardly acting support belt force.
Figure 4:
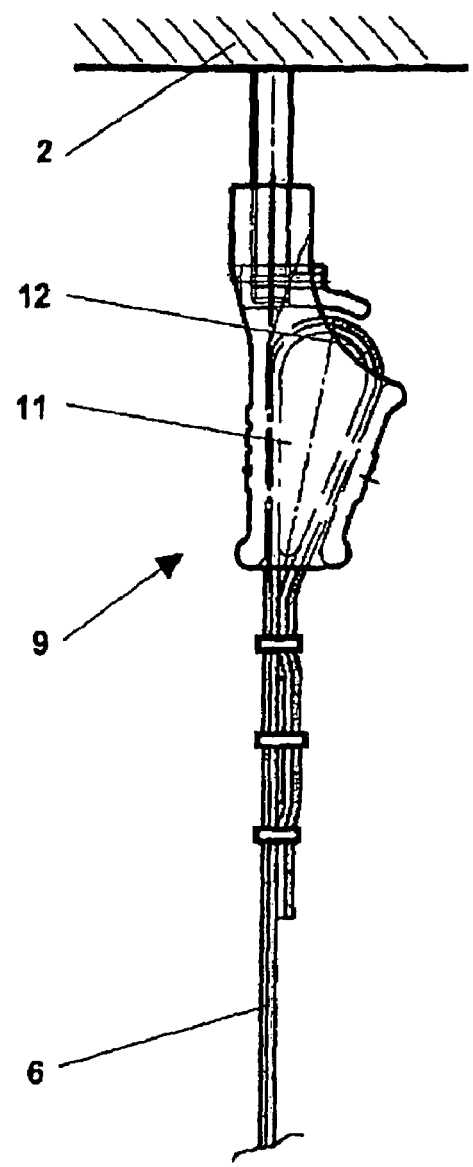
FIG. 4 shows the belt fastening of FIG. 3, fastened to an elevator shaft, with downwardly acting support belt force.

It is apparent in FIGS. 3, 4 and 5 how the support belt 6 is held in the belt end connection 9 by means of a wedge 12, which fixes the support belt in a wedge pocket 11.

The part of the belt end connection 9 containing the wedge 12 is formed by a wedge housing 10. The support belt 6 has, as illustrated in FIG. 5, a loose run 7 at its unloaded end. This loose run 7 runs onto a wedge pocket adhesion surface 15 inclined relative to the vertical direction and is pressed there by the wedge 12, by means of its wedge clamping surface 13, onto the wedge pocket adhesion surface 15. The support belt 6 is now guided around a wedge curve 14 and runs between the opposite wedge clamping surface 13 and a wedge pocket slide surface 16, which is oriented substantially vertically or in a tension direction of the support belt 6, to the supporting run 8 of the support belt 6. The tension force of the support belt 6 is thus applied substantially by the pressing along the wedge pocket surfaces 15 and 16 and the looping around of the wedge. In the loading process, the loose run 7 remains adhering at its entry point P1. As a consequence of stretching of the support belt 6, a small relative movement with respect to the wedge pocket adhesion surface 15 results in the direction of an opposite point P2. The support belt 6 draws the wedge 12 into the wedge pocket 11. Thus, there is the result that the support belt 6 slides along the wedge pocket slide surface 16.

According to the present invention at least a surface, which faces the wedge 12, of the wedge pocket 15, 16 is provided with a roughness different by comparison with the remaining surface of the wedge pocket 11 or the wedge housing 10.

The advantage of this invention is to be seen in that the friction force able to be transmitted from the wedge housing 10 to the support belt 6 is increased. The roughness of the wedge pocket surface 15, 16 can be realized in correspondence with a desired sliding behavior of the support belt.

In a particularly advantageous embodiment the wedge pocket adhesion surface 15 lying closer to the loose run 7 of the support belt 6 is provided with a roughness increased by comparison with the remaining surface of the wedge pocket 11 or the wedge pocket slide surface 16 lying closer to the supporting run 8 of the support belt 6 is provided with a roughness reduced by comparison with the remaining surface of the wedge pocket 11.

This is particularly advantageous, since on loading of the support belt 6 the pressing force, which arises by drawing in the wedge 12, of the wedge 12 on the wedge pocket 11 increases especially the possible supporting force in the support belt 6 on the side of the wedge pocket adhesion surface 15, whereby the maximum possible support belt force is significantly increased as a consequence of the looping around of the wedge 12 without in that case the pressing of the support belt 6 being too high. The force is then continuously increased, since the force increase is built up on the side of the loose run 7. Thereby a high punctiform pressing or load jump is not produced, a high supporting force can be transmitted and the belt end connection 9 can be constructed economically and in a manner friendly to assembly.

In a realized example the wedge pocket adhesion surface 15 apparent in FIG. 5 is produced with a mean roughness Ra of more than 25 μm (micrometers). This surface quality is achieved, for example, in that in the case of producing the wedge housing 10 by means of casting a coarse-grained sandpaper is placed in the casting mould. The thereby arising coarse-grained surface has a mean roughness Ra lying in the region of 25 µm to 75 µm. Currently usual casting qualities have in the case of use of a high-quality ductile cast iron a mean surface roughness of 5 µm to 20 µm.

Ideally the difference of the mean roughness Ra of the wedge pocket adhesion surface from the mean roughness Ra of the wedge pocket slide surface is at least 10 µm. The mean roughness Ra of the wedge pocket surface with the lesser roughness is thus more than 30% smaller than the mean roughness Ra of the wedge pocket surface with the greater roughness.

In the case of use a wedge housing 10 of steel plate a desired surface roughness can be achieved by, for example, stamping.

The advantage of this embodiment is that favorable production methods can be selected and thus the belt end connection can be constructed economically. Moreover, the belt end connection 9 contains few parts and can be constructed in very assembly-friendly manner.

A wedge angle of the wedge (αk) is constructed in correspondence with a housing angle (αg) of the wedge pocket. According to experience the wedge angle of the wedge (αk) is slightly greater than the housing angle (αg). Thus, a pressing which decreases in the direction of the entry of the support cable is achieved, which produces a significantly gentle treatment of the support belt and increases resistance to oscillation. In a realized example the wedge angle (αk) is formed to be greater by 2° than the housing angle (αg), wherein the housing angle (αg) is 20°.

On many occasions present-day support belts 6 have a shaped surface. This shaped surface or this contour can be, for example, transversely toothed, like a cogged belt, it can be longitudinally grooved, like a wedge-ribbed belt, or it can be nubbed. The support belt 6 can in that case be symmetrical or asymmetrical, for example smooth on one side and grooved on the other side. In an alternative belt end connection, the wedge pocket adhesion surface 15 is shaped in correspondence with a contour of the support belt.

In that case it is advantageous that the force transmission from the support belt 6 to the belt end connection 9 is optimized.

Further advantageous characteristics can be achieved through the formation of the wedge clamping surfaces 13 and the wedge curve 14 of the wedge 12.

Figure 6:
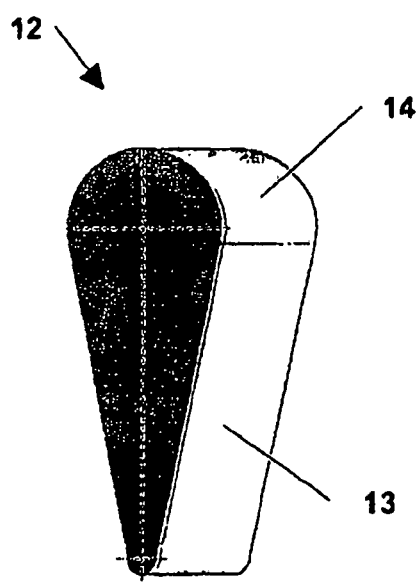
FIG. 6 is a perspective view an embodiment of the wedge with a smooth surface.

In a first wedge variant the surface of the wedge 12, as illustrated in FIG. 6, can be substantially smooth. This alternative can be produced particularly economically.

Figures 9, 9A:
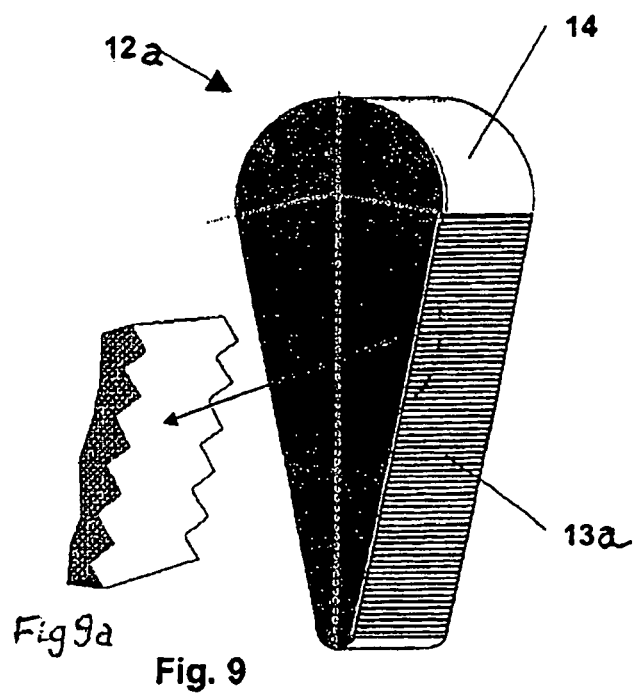
FIG. 9 is a perspective view of further embodiment of a wedge with transverse grooves (enlarged detail FIG. 9a).

A second wedge variant proposes that the wedge clamping surfaces 13a of the wedge 12a, as recognizable in FIG. 9, are formed with transverse grooves (corrugated). Ideally, in that case the wedge curve 14 is, for simplification of manufacture, formed to be smooth. With this wedge variant, in particular, the resistance against increased ambient temperatures is significantly increased. Thus, in a test, even in the case of a melting casing of the support belt 6—as can occur, for example, in the event of a fire—support loads can be achieved which exceed 80% of the minimum breaking strain of the support belt. In addition, oscillation resistance of the belt end connection is improved. This is achieved because load-bearing tensile strands of the support belt 6 are clamped by the transverse grooves. The construction with a smooth wedge curve 14 in addition preserves the support belt 6, since in the region of strong deflection it lies entirely on the wedge curve 14.

Figure 8:
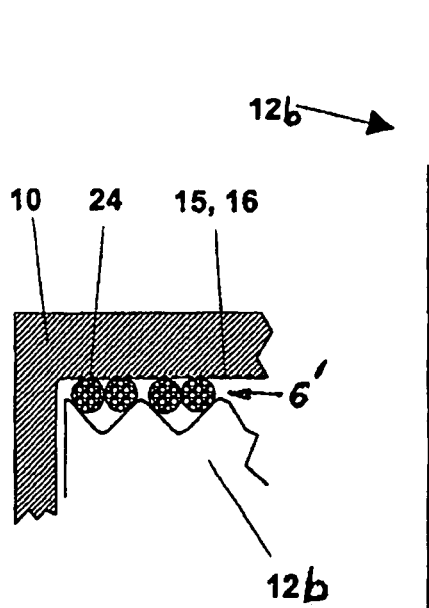
FIG. 8 is a fragmentary illustration of another embodiment of a wedge with longitudinal grooves with clamped tensile strands.
Figures 7, 7A:
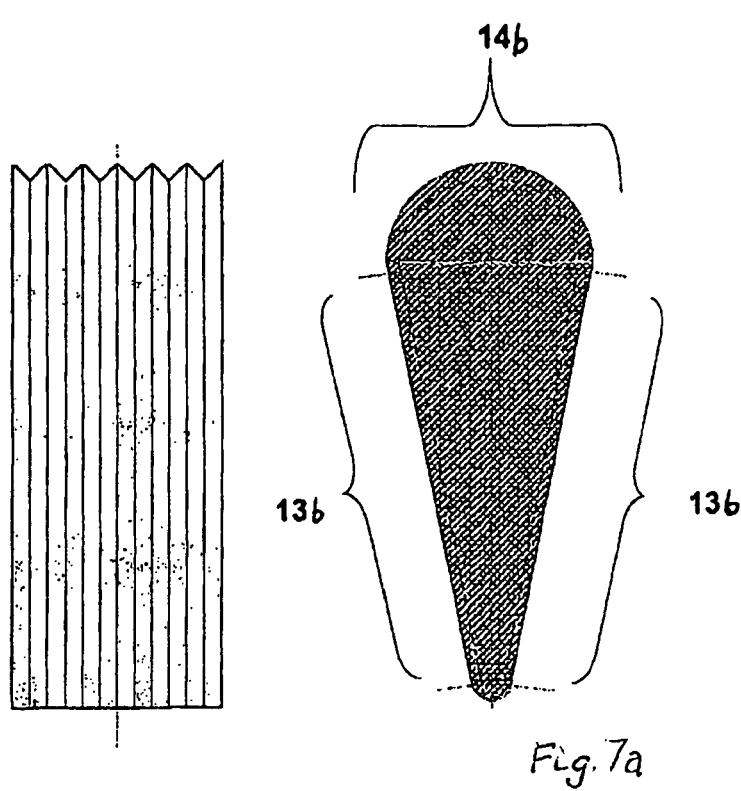
FIG. 7 is a front view of an alternate embodiment of a wedge with longitudinal grooves (side view FIG. 7a)

In the case of a third wedge variant 12b the wedge clamping surfaces 13b and the wedge curve 14b are provided with longitudinal grooves, as apparent in FIGS. 7 and 7a, or they are formed in correspondence with the contour of the support belt. This variant is advantageously employed for use only with an appropriately shaped support belt 6. Thus, in the case of a longitudinally grooved wedge a wedge-ribbed belt is used and the wedge-ribbed belt is in that case placed by the grooved surface around the wedge. The longitudinal grooves—or the corresponding contour—produce an ideal transmission of the support belt force and they similarly increase the temperature resistance as well as oscillation resistance of the belt end connection. In addition, in the case of a melted casing of the support belt—which can arise as a consequence of a fire in the building—load-bearing tensile strands 24, of the support belt 6' are clamped, as apparent in FIG. 8 by the wedge 12b.

In an advantageous embodiment the wedge 12 (12a, 12b) is produced from a material which is soft in relation to the wedge housing 10. In that case aluminum has proved particularly satisfactory. Aluminum has a modulus of elasticity approximately corresponding with a third (⅓) of the modulus of elasticity of steel. This "soft" wedge ensures a gentle clamping of the support belt and thus prevents damage.

In a special variant of embodiment the surface of the wedge pocket 15, 16 is realized with a different roughness by means of an insert plate. This allows a modular mode of construction of a belt end connection, since the wedge housing 10 can be combined with different insert plates.

FIGS. 5a and 5b show schematic cross-sections through the support belt 6 by way of example. The support belt 6 is produced in accordance with the load-bearing and drive-capability requirements. It usually consists of at least two, or several, cable strands 6a (24 in FIG. 8) which are arranged at a spacing relative to one another, and a casing 6b, which separates the cable strands 6a from one another and encloses them. In another variant the support belt 6" consists of two or more cables 6a", which are arranged at a spacing relative to one another and a casing 6b", which separates the individual cables 6a" from one another and encloses them. Essentially thermoplastic materials or elastomeric materials are used as casing material. A width "b" of the corresponding support belt 6, 6" corresponds with at least twice the height "h" of the belt. The casing 6b, 6b" of the support belt has a shape appropriate to function. For example, as illustrated in FIG. 5a it is stamped in correspondence with the cable shape, whereby longitudinal grooves result, or it has, as apparent in FIG. 5b, a functional surface in the form of longitudinal or transverse grooves. The casing 6b, 6b" is designed for the purpose of transmitting the drive forces, which are required for driving a elevator, from a drive pulley to the load-bearing cables or cable strands 6a, 6a" and it essentially has to transmit within the belt end connection 9 a supporting force, which acts in the support belt 6, 6", from the cables or the cable strands 6a, 6a" to the belt end connection 9. The cable or the cable strands 6a, 6a" preferably consist of metallic material, such as, for example, steel, or they consist of synthetic material fibers.

With knowledge of the present invention the elevator expert can change the set shapes and arrangements as desired. Thus, for example, the expert can also use the belt end connection in a horizontal position of installation.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A belt end connection for fastening an end of a support belt in an elevator installation, wherein the support belt is held in a wedge pocket by a wedge, comprising: a wedge housing having a wedge pocket formed therein including at least one wedge pocket surface facing a wedge inserted in said wedge pocket, said at least one wedge pocket surface having a first surface roughness which is different from a second surface roughness of another surface of said wedge pocket.

2. The belt end connection according to claim 1 wherein said at least one wedge pocket surface is a wedge pocket adhesion surface lying closer to a loose run of a support belt inserted in said wedge pocket, said wedge pocket adhesion surface having the first surface roughness being greater than the second surface roughness said another surface of said wedge pocket.

3. The belt end connection according to claim 2 wherein the first surface roughness has a mean roughness Ra of more than 25 μm.

4. The belt end connection according to claim 2 wherein said wedge pocket adhesion surface is shaped in correspondence with a contour of the support belt.

5. The belt end connection according to claim 1 wherein said at least one wedge pocket surface is a wedge pocket slide surface lying closer to a supporting run of a support belt inserted in said wedge pocket, said wedge pocket slide surface having the first surface roughness being less than the second surface roughness said another surface of said wedge pocket.

6. The belt end connection according to claim 5 wherein the first surface roughness has a mean roughness Ra of less than 20 μm.

7. The belt end connection according to claim 1 wherein said at least one wedge pocket surface is a wedge pocket adhesion surface lying closer to a loose run of a support belt inserted in said wedge pocket, said wedge pocket adhesion surface having the first surface roughness being greater than the second surface roughness said another surface of said wedge pocket, said wedge pocket having a wedge pocket slide surface lying closer to a supporting run of a support belt inserted in said wedge pocket, said wedge pocket slide surface having the third surface roughness being less than the second surface roughness said another surface of said wedge pocket, and a difference between a mean roughness of said wedge pocket adhesion surface a mean roughness of said wedge pocket slide surface is at least 10 μm.

8. The belt end connection according to claim 1 wherein said wedge has one of a substantially smooth surface, a part of a surface of said wedge in contact with said support belt is shaped in correspondence with a contour of said support belt, and a part of a surface of said wedge in contact with said support belt is shaped to be transversely grooved or longitudinally grooved.

9. The belt end connection according to claim 1 wherein said wedge is formed of an aluminum material.

10. The belt end connection according to claim 1 wherein said at least one wedge pocket surface is formed by an insert plate in said housing.

11. The belt end connection according to claim 1 including a support belt having at least two cables or cable strands are arranged at a spacing from one another and a casing which separates the individual cables or cable strands from one another and encloses them, said cable casing being formed of a thermoplastic material or an elastomer and wherein a width of said support belt is at least twice a height of said support belt.

12. A method for fastening an end of a support belt in an elevator installation, wherein the support belt is held in a wedge pocket of a wedge housing by a wedge, comprising the steps of:
   a. providing a housing having a wedge pocket for receiving an end of a support belt and a wedge; and
   b. forming at least one wedge pocket surface in the wedge pocket facing the wedge for engaging the support belt end, the at least one wedge pocket surface having a first surface roughness which is different from a second surface roughness of another surface of the wedge pocket.

* * * * *